United States Patent [19]

Tazawa et al.

[11] Patent Number: 5,183,343
[45] Date of Patent: Feb. 2, 1993

[54] METHOD OF PRINTING BAR CODES BY A BAR CODE PRINTER

[75] Inventors: Shigeru Tazawa; Yutaka Shibata, both of Miyagi, Japan

[73] Assignee: Tohoku Ricoh Co., Ltd., Miyagi, Japan

[21] Appl. No.: 897,052

[22] Filed: Jun. 11, 1992

[30] Foreign Application Priority Data

Jun. 12, 1991 [JP] Japan .................. 3-167719

[51] Int. Cl.$^5$ ........................ B41J 5/00
[52] U.S. Cl. ................. 400/103; 400/120; 101/93.01; 346/76 PH; 235/463
[58] Field of Search .............. 400/103, 120; 346/76 PH; 101/93.01, 483; 235/462, 463

[56] References Cited

U.S. PATENT DOCUMENTS 4,824,266 4/1989 Fujii et al. .................. 400/103
4,917,011 4/1990 Bernauer .................... 101/483

FOREIGN PATENT DOCUMENTS 0260917 3/1988 European Pat. Off. ......... 400/103
0045072 2/1988 Japan ...................... 400/103
1-204767 8/1989 Japan .

OTHER PUBLICATIONS

"Optical Scanner Compensation for Bar Codes", IBM Tech. Disclosure Bulletin, vol. 17, No. 3, Aug. 1974, pp. 724–725.

*Primary Examiner*—Eugene H. Eickholt
*Attorney, Agent, or Firm*—Armstrong, Westerman, Hattori, McLeland & Naughton

[57] ABSTRACT

This invention relates to a bar code printing method of printing bar codes consisting of bars and spaces having the width of $(n+0.5)$ P by a bar code printer having a line thermal head with a number of heating elements arrayed at a specified pitch P, in which $n+1$ pieces of heating elements on the aforesaid line thermal head are allocated to sections corresponding to bars in a bar code and n pieces of heating elements to sections corresponding to spaces in the bar code (n: a positive integer in both cases) and the heating elements allocated to the aforesaid bars are heated when bar codes are printed.

1 Claim, 2 Drawing Sheets

METHOD OF PRINTING BAR CODES BY A BAR CODE PRINTER

FIELD OF THE INVENTION

This invention relates to a method of printing bar codes by a bar code printer having a line thermal head, and more particularly relates to a method of printing bar codes having a unit pitch of 0.5 P by a bar code printer having a line thermal head with a heating element pitch of P (mm).

DESCRIPTION OF PRIOR ART

Many of bar code printers actually used at present are based on a system, in which a number of heating elements are arrayed at a specified pitch on a line thermal head (also simply called "thermal head"), and ink on a thermal transfer ink ribbon is transferred onto such a material as label paper by selectively heating some of the heating elements to print a bar code comprising a number of bars, each having different width, on the material.

Types of thermal transfer ink ribbon used in a bar code printer based on the thermal transfer system as described above are largely divided to wax-based ribbons and plastics-based ones.

Waxed-based ribbons have a merit that they easily melt and spread to a wide area under low temperature, but the life of letters printed with this type of ribbon is short because their abrasion resistance and chemical resistance are rather low. As compared to this type, plastics-based ribbons have a shortcoming that they do not melt and spread to a wide area under low temperature, but are widely used especially for bar code printers because the life of letters printed with this type of ribbon is excellent.

Methods for printing bar codes in bar code printers using wax-based ribbons include a half pixel over-burn system in which bar codes, each $n+0.5$ ($n=1,2 \ldots$ :positive integer) times larger than a heating element pitch on the thermal head, are drawn.

A bar code printer based on this system can print bar codes having a unit pitch of 0.5 P with a thermal line head with a heating element pitch of P (mm), which is one of the big sales points of the product.

The bar code printing method based on the half pixel over-burn as described above was disclosed in Japanese Patent Application Laid Open Publication No. 1-204767.

To briefly explain the mechanism, when a bar code having the width which is $(n+0.5)$ times larger than a heating element pitch P on a thermal head is printed, n pieces of heating element 10 are allocated to a section B corresponding to a bar heated to transfer ink and $n+1$ pieces of heating element 10 are allocated to a section S corresponding to a space where the heating elements are not heated and a blank is generated, as shown in FIG. 4.

With this mechanism, by applying to a thermal head a larger quantity of energy than that required to draw a bar having width which is n times larger than P with n pieces of heating elements 10, when printed on paper, the width w of bar section 12 of bar code 11 can be enlarged to (n 30 0.5) P and the width s of the space section can be narrowed to $(n+0.5)$ P, as shown in FIG. 5 (a).

Accordingly, the printed bar width is equal to the space width. It should be noted that, in FIG. 5, NB, WB, NS and WS indicate groups of heat elements corresponding to a thin bar, a thick bar, thin space and a thick space respectively, and that, in this case, the width of thin bar (equal to the width of thin space) is 2.5 P and the width of thick bar (equal to the width of thick space) is 5.5 P.

The conventional method of printing bar codes as described above is effective when a wax-based thermal transfer ink ribbon, ink of which easily melts and spreads to a wide area under low temperature, is used When a plastics-based thermal transfer ink ribbon, ink of which hardly melts and spreads to a wide area under low temperature, is used, the result of printing by ṅ pieces of heating element is as shown in FIG. 5 (b), and the width w of the bar section 12 is generally narrow. For this reason, it has been difficult to print a bar code consisting of bars and spaces, each having the width of $(n+0.5)$ P.

For, as energy loaded to a thermal head is increased, the bar width W becomes thicker to a certain degree, but if excessive energy is loaded to the thermal head, a life of the thermal head is extremely shortened, or a base film of the thermal transfer ink ribbon is melted and deposited on a surface of the thermal head, and energy loaded to the thermal head can not be increased to a necessary level because of the side effects as described above.

SUMMARY OF THE INVENTION

The present invention was made to solve the problems as described above, and the object is to provide a bar code printer having a line thermal head with a heating element pitch of P (mm) which can accurately print bar codes having a unit pitch of 0.5 P and consisting of bars and spaces, each having a width which is $(n+0.5)$ times larger than the heating element pitch P described above, with a plastics-based thermal transfer ink ribbon.

To achieve the object described above, in the bar code printing method according to the present invention, $n+1$ pieces of heating elements are allocated to a section corresponding to bars in a bar code, while n pieces of heating elements are allocated to a section corresponding to a space in the bar code (n: a positive integer in both cases), and a bar code consisting of bars and spaces, each having a width of $(n+0.5)$ P by controlling energy loaded to the aforesaid line thermal head to selectively heat the heating elements allocated to the section corresponding to the bars.

With the bar code printing method according to the present invention, energy loaded to a line thermal head can be reduced to a level lower than that required to draw bars, each having the width of nP with n pieces of heating elements, and bars, each having the width of $(n+0.5)$ P, can be printed with $n+1$ pieces of heating elements, thus a width of space being enlarged to $(n+0.5)$ P.

Namely, a quantity of energy loaded to a line thermal head can be suppressed to a low level. With this feature, it is possible to print bar codes having a unit pitch of 0.5 P by using a line thermal head with a heating element pitch of P and a plastics-based thermal transfer ink ribbon without shortening a life of the thermal head nor melting a base film of the thermal transfer ink ribbon.

The above and other objects, features and advantages of the invention will be apparent from the following detailed description which is to be read in conjunction with the accompanying drawings.

DETAILED DESCRIPTION OF THE PREFERRED EMBODIMENT

Description is made for preferred embodiments of the present invention with reference to the drawings.

Figure 1:
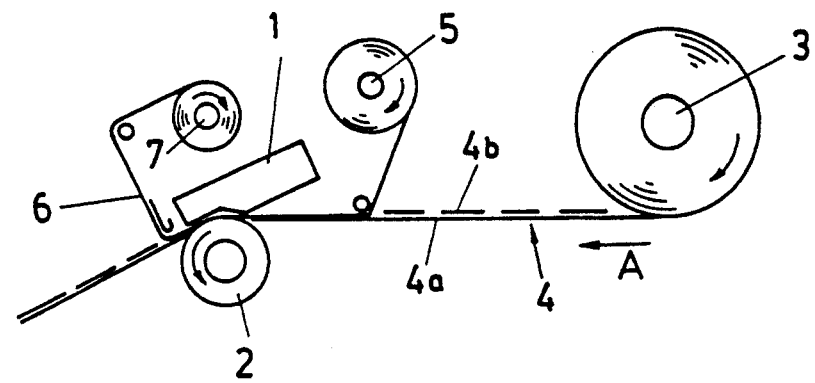
FIG. 1 is a summarized block diagram showing an example of a thermal transfer bar code printer in which the bar code printing method according to the present invention has been embodied.

FIG. 1 is a summarized block drawing showing an example of a bar code printer based on the thermal transfer system in which the bar code printer according the the present invention has been embodied.

This bar code printer based on the thermal transfer system has a line thermal head 1 with a number of heating elements arrayed at a specified pitch arranged in a manner where the thermal head 1 can be pressed to a paper feed roller 2.

Label paper 4 wound around a label paper feed shaft 4 and a thermal transfer ink ribbon 6 wound around a ribbon feed shaft 5 are dispensed respectively and are overlaid with each other, both of them pass through between the paper feed roller 2 and the line thermal head 1, being held by the two components, and then the label paper 4 is wound up by a label paper take-up shaft (now shown), while the thermal transfer ink ribbon 6 is wound up by a ribbon take-up shaft 7.

In the label paper 4, labels 4b are adhered to the base paper 4a at a specified interval along the carrying direction (the direction indicated by arrow head A in the figure), and when the label paper 4 passes through the paper feed roller 2 and the line thermal head 1, a number of heating elements on the line thermal head are selectively heated and ink on the thermal transfer ink ribbon 6 is transferred to each of the labels 4b, thus bar codes being printed.

The paper feed roller 2, the ribbon take-up shaft 7, and the label paper take-up shaft not shown are rotated by a driving motor not shown in the figure via such devices as gears respectively. Rotation of the motor, data transfer to the line thermal head 1 and energizing are controlled by a control unit not shown similarly in the conventional systems.

Figure 2:
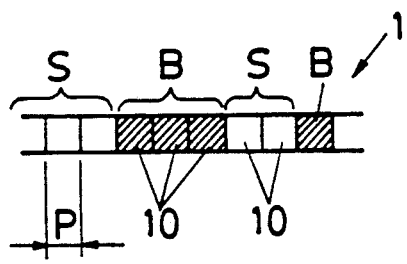
FIG. 2 is an explanatory drawing illustrating an example of allocation of heating elements in a line thermal head when the present invention is embodied in the bar code printer shown in FIG. 1.

An example of heating element allocation in the line thermal head in this embodiment is shown in FIG. 2.

Namely, in order to print a bar code consisting of bars and spaces, each having the width of $(n+0.5)$ P, on a label 4b using the plastics-based thermal transfer ink ribbon 6, $n+1$ pieces of heating element 10 are allocated to the section B corresponding to a bar to which ink is transferred by selectively heating some of the heating elements, while n pieces of heating elements are allocated to the section corresponding to a space which is left blank (n: a positive integer).

In addition, a quantity of energy loaded to the line thermal head 1 is reduced to a level lower than that required when a bar having the width of nP is printed by n pieces of heating elements 10, and a bar having the width of $(n+0.5)$ P is printed by $n+1$ pieces of heating elements 10. With this feature, the width of a space is enlarged to $(n+0.5)$ P.

Figure 3:
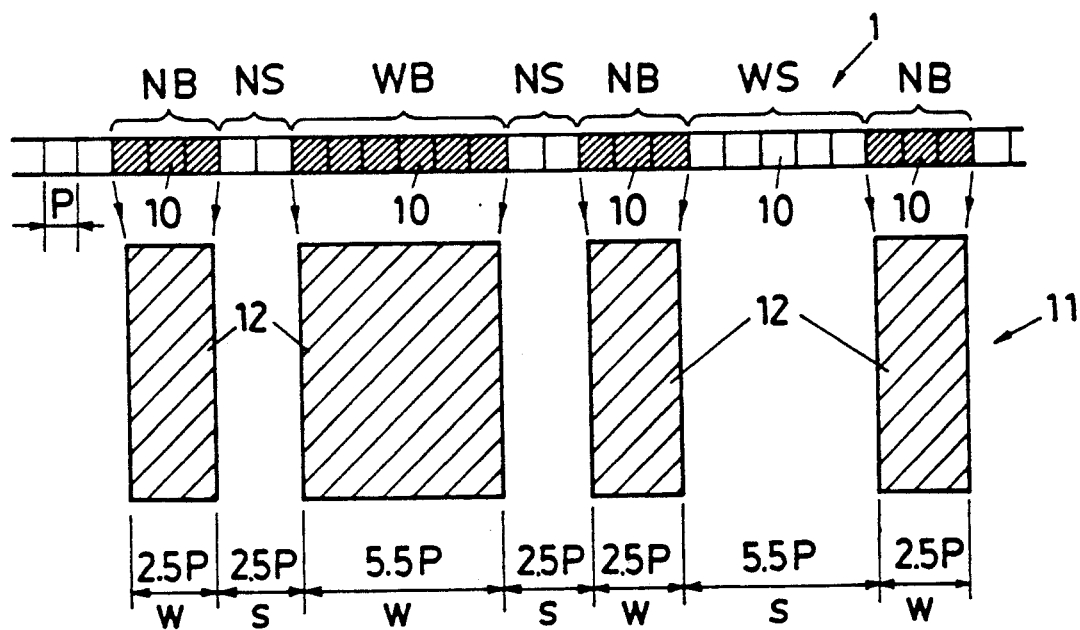
FIG. 3 is an explanatory drawing showing an example of allocation of heating elements in the line thermal head 1 and its relation with bar codes printed by the line thermal head 1.
Figure 4:
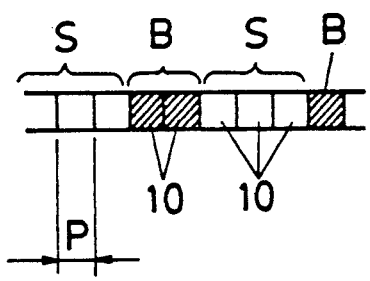
FIG. 4 and FIG. 5 are drawings illustrating a bar code printing method based on the conventional half pixel over-burn system and the problems.
Figure 5:
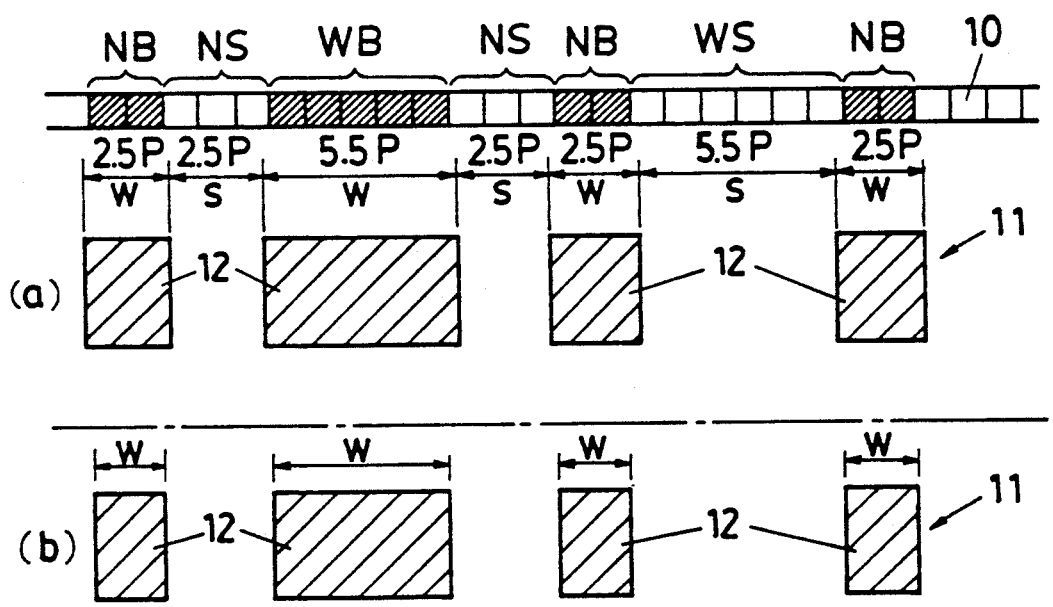

FIG. 3 shows, as a concrete example of the above composition, a relation between allocation of heating elements 10 and the widths w and s of each section of a resultant bar code 11, when a bar code consisting of thin bars and thin spaces, each having the width of 2.5 P, and thick bars and thick spaces, each having the width of 5.5 P, are printed. Also in FIG. 3, NB, WB, NS and WS indicate groups of heating elements corresponding to a thin bar, a thick bar, a thin space and a thick space respectively, like in FIG. 5 above.

There are the following two ways to calculate a quantity of energy to be loaded to the line thermal head 1 to draw a bar 12 having the width w of $(n+0.5)$ P with $n+1$ pieces of heating element and a space having the width s of $(n+0.5)$ P with n pieces of heating elements.

(1) A bar width measuring unit is included in a bar code printer to measure the bar width w of printed bar codes. An error of the width of printed bar codes from the specified bar width of $(n+0.5)$ P, if any, is fed back to the control unit to automatically adjust energy to be loaded to the line thermal head. With this facility, bar codes consisting of bars and spaces, each having the width of $(n+0.5)$ P, can accurately be printed.

(2) In a bar code printer not including the bar width measuring unit, a quantity of energy to be loaded to the thermal head to print bars having the width w of $(n+0.5)$ P is calculated preliminarily, and printing is carried out after a dial or a switch to adjust the quantity of energy is set to a position required to obtain the quantity of energy.

It should be noted that the embodiment described above shows a case where binary codes having two types of bar and space width are printed, and that the same composition is applicable also to cases where, for instance, quadruple codes are printed.

As described above, with the present invention, a quantity of energy to be loaded to a line thermal head can be suppressed to a low level. Because of this feature, bar codes having a unit pitch of 0.5 P can be printed by using a line thermal head with a heating element pitch of P and a plastics-based thermal transfer ink ribbon while preventing the 2 types of side effect observed in the conventional bar code printing method that a life of a line thermal head is shortened, and that a base ribbon of a thermal transfer ink ribbon melts.

Having described an illustrative embodiment of the invention with reference to the accompanying drawings, it is to be understood that the invention is not limited to such a precise embodiment, and that various changes and modifications many be effected therein by one skilled in the art without departing from the scope and spirit of the invention as defined in the appended claims.

What is claimed is:

1. A method of printing bar codes by a bar code printer having a line thermal head with a number of heating elements arrayed at a specified pitch P; by allocating $n+1$ pieces of heating element to sections corresponding to bars in a bar code, and n pieces of heating elements to sections corresponding to spaces in the bar code (n: a positive integer in both cases), and selectively heating the heating elements allocated to sections corresponding to the aforesaid bars by means of controlling a quantity of energy to be loaded to the aforesaid thermal line head to print bar codes, each consisting of bars and spaces having the width of (n+0.5) P, by transferring ink on a plastics-based thermal transfer ink ribbon to paper.

* * * * *